United States Patent [19]

Serole

[11] Patent Number: 5,723,027
[45] Date of Patent: Mar. 3, 1998

[54] METHOD FOR PREPARING A POWDER IN A PLASMA ARC AND DEVICE FOR CARRYING OUT SAID METHOD

[75] Inventor: Bernard Serole, Peyrins, France

[73] Assignee: W.C. Heraeus GmbH, Hanau, Germany

[21] Appl. No.: 640,756

[22] PCT Filed: Sep. 7, 1995

[86] PCT No.: PCT/EP95/03513

§ 371 Date: May 7, 1996

§ 102(e) Date: May 7, 1996

[87] PCT Pub. No.: WO96/07475

PCT Pub. Date: Mar. 14, 1996

[30] Foreign Application Priority Data

Sep. 7, 1994 [FR] France .................. 94 10874

[51] Int. Cl.⁶ .................................. B01J 19/08
[52] U.S. Cl. .............. 204/164; 422/186.04; 422/186.26
[58] Field of Search ............ 204/164; 422/186.04, 422/186.23, 186.26, 906

[56] References Cited

U.S. PATENT DOCUMENTS

| | | | |
|---|---|---|---|
| 2,157,498 | 5/1939 | Reinecke et al. | 91/12.2 |
| 2,837,654 | 6/1958 | Berghaus et al. | 422/186.04 |
| 3,101,308 | 8/1963 | Sheer et al. | 204/164 |
| 3,708,409 | 1/1973 | Bainbridge | 11/9 |
| 4,801,435 | 1/1989 | Tylko | 422/186.04 |
| 5,196,102 | 3/1993 | Kumar | 427/528 |
| 5,562,809 | 10/1996 | Sorokin | 204/164 |

FOREIGN PATENT DOCUMENTS

| | | |
|---|---|---|
| 378483 | 10/1907 | France . |
| 1560417 | 3/1969 | France . |
| 2603209 | 3/1988 | France . |
| 916 288 | 12/1955 | Germany . |
| 281 749 | 9/1947 | Switzerland . |
| 959027 | 5/1964 | United Kingdom . |

OTHER PUBLICATIONS

French Ministry of Instruction and Higher Education, "Les Plasmas Industriels", No. 10, (1986), pp. 107 to 111 (and English language translation thereof), (no month available).
Patent Abstracts of Japan, of JP–62111373, (May 1987), vol. 11, No. 328.

Primary Examiner—Kathryn L. Gorgos
Assistant Examiner—Kishor Mayekar
Attorney, Agent, or Firm—Frishauf, Holtz, Goodman, Langer & Chick, P.C.

[57] ABSTRACT

A method for the continuous preparation of a powder by reacting at least two reagents in a plasma arc, in which a first and a second reagent are fed to the plasma arc, which is maintained by a voltage applied between a first and a second electrode. At least the first reagent is electrically conductive and comprises the first electrode. The first reagent is fed to the plasma arc in a fluid form. A device for carrying out the method is provided. The device includes a parabolic shaped plasma chamber, a means for feeding at least the first reagent to the plasma chamber, and at least two electrodes for generating a plasma arc in the plasma chamber.

20 Claims, 3 Drawing Sheets

METHOD FOR PREPARING A POWDER IN A PLASMA ARC AND DEVICE FOR CARRYING OUT SAID METHOD

BACKGROUND OF THE INVENTION

1. Field of the Invention

The invention pertains to a method for the continuous preparation of a powder by reacting at least two reagents in a plasma arc, in which one first and one second reagent are fed to the plasma arc which is maintained by a voltage applied between a first and a second electrode, whereby at least the first reagent is electrically conductive and is used as the first electrode.

2. Background Information

Furthermore, the invention pertains to a device for the continuous preparation of a powder by reacting at least one first and one second reagent in a plasma arc, with a feed arrangement for feeding at/east the first reagent to the feed opening of a plasma chamber which has an interior tapering in the direction of a passage lying opposite the feed opening, and with at least two electrodes which are connected to a generator for maintaining the plasma arc in the plasma chamber, whereby the first electrode is formed by the first reagent.

Plasma is a complex medium which is obtained at very high temperatures of e.g. 3000° C. It is very reactive so that chemical reactions take place at a high velocity. Plasma is formed by the ionization of a gas resulting from the electric discharge of a direct current, from high-frequency discharge, and from microwave discharge. Examples of present-day use are: Reduction of iron ore by injecting iron ore (oxide) and coal into a plasma burner; by injecting numerous metal oxides $Cr_2O_3$, $SiO_2$, $CaO$ and $MgO$.

Plasma arcs are used primarily in metallurgy at temperatures exceeding 1500° C. They consume large quantities of electric energy. They require electrodes which after use become waste, and therefore contribute to environmental pollution.

An induction plasma can in fact be produced without electrodes, although its performance is weaker, as described in the documentation "nes Plasmas Industriels" of the French Ministry of Instruction, Research and Higher Education (La Documentation Francaise, No. 10, 1986).

A method and a device according to the type described are known from the Swiss patent specification CH 281 749. It describes a method for preparing metal halogenides, whereby an anode is produced consisting of a mixture of minerals of the corresponding metals and of carbon, and an arc in a halogen-containing atmosphere is generated between this anode and a carbon cathode, thus forming metal halogenide.

The anode is used up during this process. Due to the inhomogeneity of the anode material, the plasma burns unevenly. Moreover, the preparation of the electrode is time-intensive and costly.

A device according to the type described is known from the British patent specification GB 959,027. The plasma injection device described therein has a plasma chamber and a feed arrangement for feeding a metal wire charged as an electrode to the plasma chamber. At its underside, the feed arrangement is provided with an outlet for the wire extending coaxially to the interior of the plasma chamber which opens upward in the direction of the feed arrangement. The interior of the plasma chamber tapers downward in the direction of an outlet nozzle.

It has been demonstrated that with the known device the plasma produced in the plasma chamber cannot be stabilized sufficiently.

SUMMARY OF THE INVENTION

Thus, on one hand, the present invention has the objective of proposing a simple and economical method for the continuous and reproducible preparation of a powder by reacting at least two reagents in a plasma arc and, on the other hand, of providing a device which guarantees a homogeneous and uniform plasma and thus reproducible results.

In terms of the method, this objective was met according to the invention by feeding the first reagent to the plasma arc in fluid form.

The first reagent can be present, for example, in the form of a melt, a liquid, a suspension, a dispersion, a gel, or a shakable or pourable powder. It is not necessary to prepare a solid electrode that contains the first reagent. Signs of wear and tear or soiling through abrasion, as can be observed for example with an induction plasma, will not occur. The feeding of the first reagent to the plasma arc, for example, can be based on employing the gravity of its own weight, whereby a stream of a material containing the first reagent is fed to the plasma arc from above. By adding the first reagent to the plasma arc in fluid form, a homogeneous distribution of the reagent within such a stream can be easily achieved.

The second reagent can also be fed to the plasma arc in fluid form, e.g. as a gas. In this way one obtains a particularly stable and homogeneous plasma.

It is advantageous to charge the first reagent as an electrode with negative potential.

To save energy and to stabilize the plasma arc, the latter is provided with a type of energy which corresponds to the free formation enthalpy of the chemical compound to be prepared from the reagents plus the heat loss in the plasma arc.

A particularly stable plasma is obtained when the plasma arc is maintained in a plasma chamber which has, when viewed cross-sectionally, an essentially parabolic interior which is provided with a feed opening for the first reagent and with a passage lying opposite the feed opening. The reaction product formed in the plasma arc is released from the plasma chamber through the passage. The interior essentially has the shape of a paraboloid. In this context, it has proven especially effective for at least the first reagent to be fed to the plasma chamber in a stream, whereby the long axis of the parabolic interior of the plasma chamber extends coaxially to the stream, and for the diameter of the plasma chamber interior in the area of the feed opening to be larger than the mean ionization distance, and for the passage to have a diameter which is smaller than the mean ionization distance.

It is advantageous to ignite the plasma arc in one of the centers of the parabola. The center of the parabola should be the one that is closest to the plasma chamber. In this manner, a particularly stable plasma is obtained.

A particularly stable plasma is obtained when the passage of the plasma chamber is elongated towards the outside with a mixer tube at the outlet opening of which low pressure is maintained. In this case, the mixer tube can act as a so-called "Venturi nozzle."

It is advantageous to maintain low pressure by means of a supersonic nozzle connected to the mixer tube.

The method also proved to be advantageous for reactions in which the first reagent is fed to the plasma arc in the form of a powder, whereby the electric connection to a voltage-maintaining generator is produced by ionization of a carrier gas.

As first reagents for the method according to the invention the following metals are suitable:

Pb, Sn, Bi, Ga, Cu, In, Ag and Zn.

As second reagents, for example, the following gases are suitable:

$O_2$, air, $Cl_2$, $N_2$, or carbon-containing gases such as methane.

A method using a melt of indium and tin as first reagent and an oxidizing gas as a second reagent has proven particularly effective.

With respect to the device, the previously stated objective is met according to the invention, proceeding from the initially described device, by having the feed arrangement comprise a vessel for receiving the first reagent which is provided with an outlet on its underside facing the feed opening of the plasma chamber.

The vessel for receiving the first reagent is provided with an outlet through which the reagent can be fed to the plasma arc in fluid form. This enables implementation of the method according to the invention whose advantages have been explained above.

Through the preferred embodiment of a cross-sectionally essentially parabolic interior of the plasma chamber, both in terms of its local fixation, geometric formation, and also in terms of its energy, a particularly stable plasma arc is obtained. Apart from discontinuities, e.g., in the upper or lower area, the interior forms a paraboloid.

BRIEF DESCRIPTION OF THE DRAWINGS

An embodied example of the invention is explained hereafter in greater detail by means of the patent drawings.

DETAILED DESCRIPTION OF THE INVENTION

Figure 1:
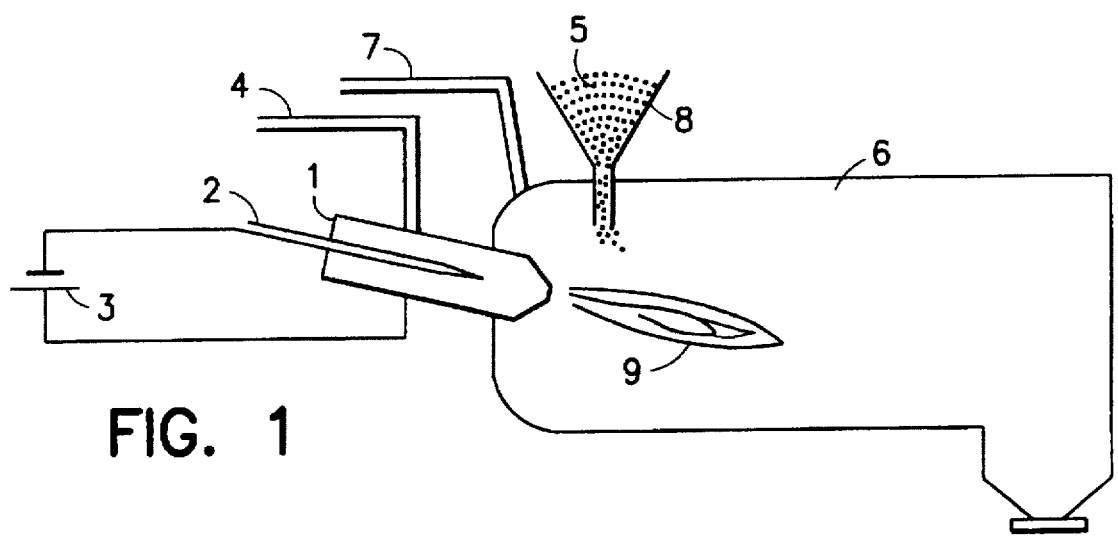
FIG. 1 is a schematic drawing showing the principle of reducing ore through a plasma arc.

FIG. 1 illustrates the principle of reducing ore through a plasma arc. Burner 1 and electrode 2 are supplied with direct current produced by generator 3. Plasma gas 4 is fed to the burner whereas an external gas 7 is fed or drawn off.

Oxide 5 or components are fed to the plasma arc 9 through a funnel 8. The powdery compound forming in the plasma arc 9 is collected in a vessel 6.

Figure 2:
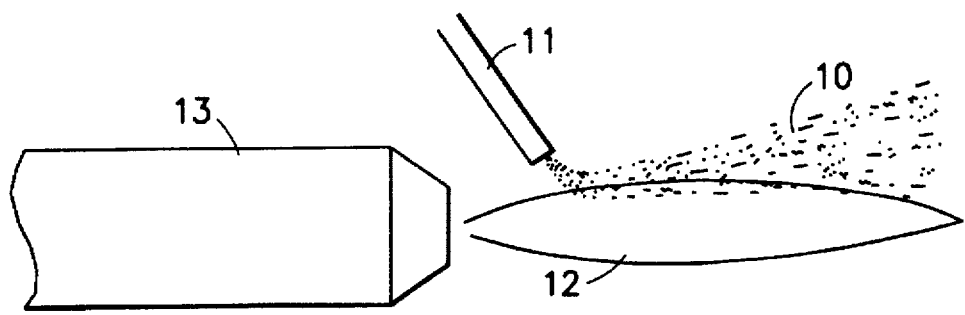
FIG. 2 is a schematic drawing showing the principle of injecting powder into a plasma flame.

FIG. 2 illustrates a further common method for preparing a powder in a plasma arc, whereby an initial powder 10 is injected into the flame 12 of a burner 13 using a sprayer 11. The illustration clearly shows that the powder produced in this manner cannot be very homogeneous.

Figure 3:
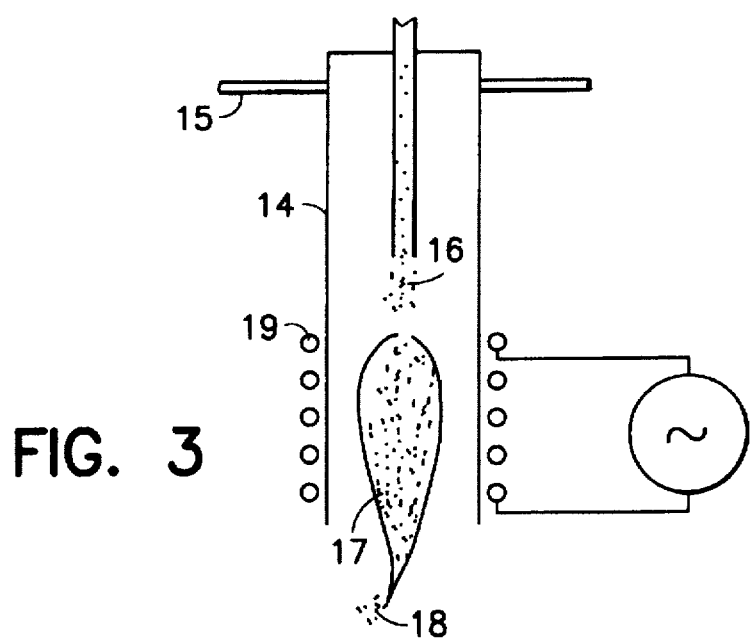
FIG. 3 is a schematic drawing showing the principle of induction plasma.

FIG. 3 illustrates the principle of induction plasma. A gas 15 is introduced into a quartz tube 14, which is ionized within a high-frequency coil 19 by a high-energy stream 16 at high velocity and thus produces plasma 17, in which the desired reaction product 18 is produced.

Figure 4:
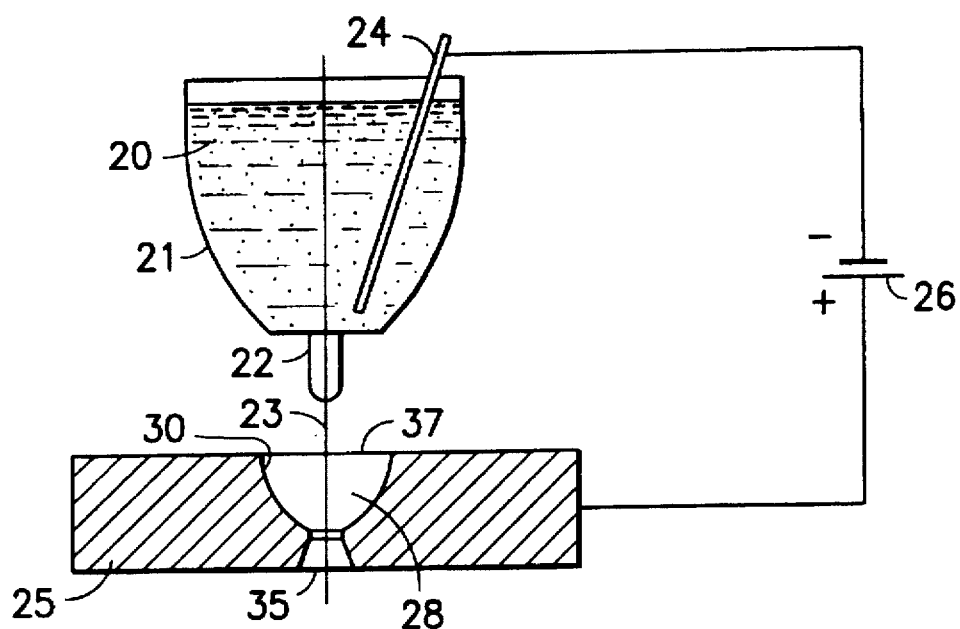
FIG. 4 is a schematic drawing showing an overall view of an embodied example of the device according to the invention.

FIG. 4 illustrates the method according to the invention using an example. Metal (liquid) metal 20 is placed in a crucible 21. Within the metal melt 20 is a rod 24 made of a high temperature-resistant, electrically conductive cermet, which is connected to a voltage source 26. The metal melt 20 thus forms the negatively charged electrode of the device.

The underside of crucible 21 is provided with a calibrated ceramic nozzle 22 from which the metal melt 20 exits in the form of a stream 23. The electrically negatively charged stream 23 flows through the feed opening 37 of the plasma chamber 28, passing the oppositely charged electrode 25 which is connected to the opposite pole of voltage source 26. Plasma chamber 28 forms within the electrode 25. The additional reagent or additional reagents is/are also introduced into the plasma chamber 28 and reacts/react with the metal melt 20 within the plasma arc to produce the desired powder. The method is, of course, also suitable for use with other known devices and methods for plasma generation, such as with high-frequency current.

A special feature of the invention consists in that the plasma is isolated in a place which is structurally solid and stable. In the known methods, as illustrated in FIG. 2, for example, the initial material, whether it consists of a solid body or granulates or powder, is distributed within the stream of ionized gas or plasma, which exits the burner at great velocity. Introduction and retention time of the initial material in the plasma are short and random.

Figure 5:
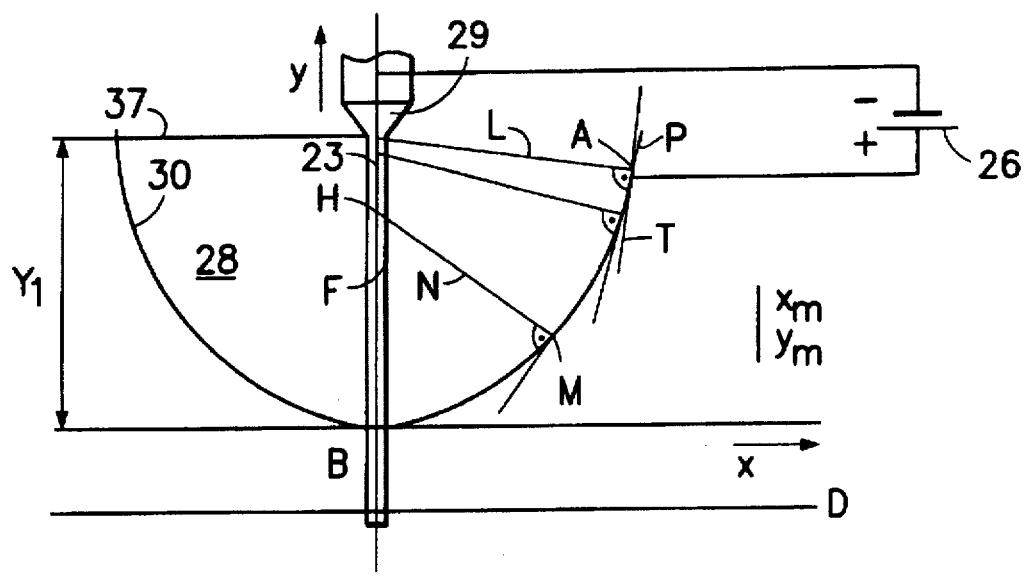
FIG. 5 is a schematic drawing showing an enlarged presentation of the plasma chamber shown in FIG. 4.

In contrast, in the method according to the invention, stream 23 of the initial material, as illustrated in the device according to FIG. 4, for example, is introduced into the parabolic plasma chamber 28. This plasma chamber 28 has a shape optimized for a given pressure or a given plasma gas. At the bottom, it transforms into a mixing tube 35 which comprises an interior that expands conically towards the outside. The distance between stream 23 and the internal side 30 of plasma chamber 28 varies gradually at first, and then decreases more and more on the downward path of stream 23. The most advantageous form of the interior 30 of plasma chamber 28, as shown in FIG. 5, was determined by calculations and confirmed by experiments. It is a parabola which is arranged coaxially to stream 23 of the initial material.

FIG. 5 shows stream 23 which, for example, is connected to the negative pole of generator 26 and exits through the nonconducting ceramic nozzle 29. Plasma chamber 28 has a feed opening 37 through which stream 23 flows into plasma chamber 28. In addition, the second reagent is fed to plasma chamber 28, for example, by way of an additional opening (not shown in the figure) in the side wall of chamber 28 or by way of a nozzle projecting into the feed opening. FIG. 5 shows an xy-coordinate, system which is placed over the parabolic plasma chamber 28, whereby the stream path within the plasma chamber corresponds to the y-axis. The parabola, which is characterized by its center F and its directrix D, has, with respect to axes x and y, the following equation:

$$(P)y=ax^2$$

where a is a constant.

The parabolic interior side 30 of plasma chamber 28 according to our invention can be produced by numerical control (CN) or with a form tool.

In the case of a continuous stream, which, according to Newton's law, remains intact on a length Y1 due to its velocity and viscosity, and assuming an ionization distance of $L_i$ based on gas and pressure within the plasma chamber 28, a distance L of at least 2 $L_i$ between stream 23 in the area of ceramic nozzle 29 and the interior side 30 of plasma chamber 28 has proven sufficient in this area.

$$L \geq 2 L_i$$

This is sufficient for characterizing the parabola which is a second degree curve and is defined via point "A" and crunode "B" by the following formula:

$$(P)\ Y = ax^2.$$

We proceed from the assumption that "a" is a known constant whose determination from the above given data is evident to an expert in this field.

Figure 6:
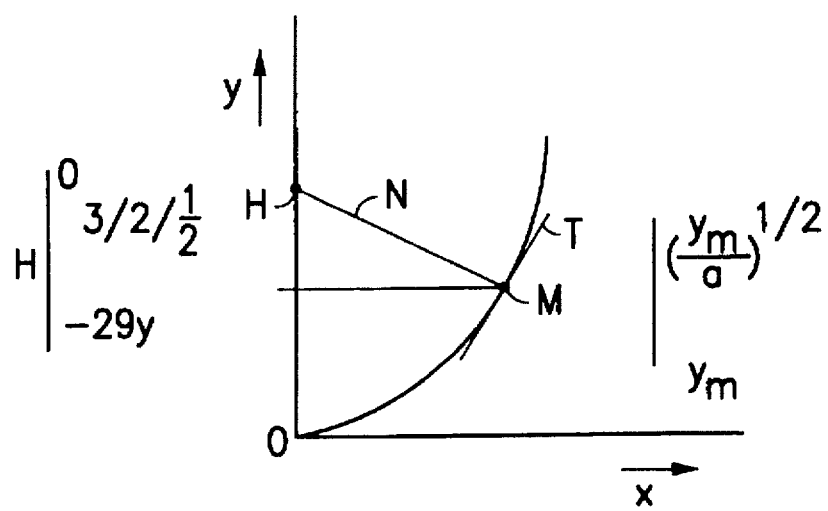
FIG. 6 is a graph which explains the ionization distance.

FIG. 6 illustrates that the parabolic interior 30 of plasma chamber 28 produces a plasma arc which is as stable as possible. In fact, a point M (x,y) of P and of its tangent results in the derivation equation of P.

$$P: y = ax^2$$

$$T: y' = 2ax + b.$$

where $$y = ax_m^2.$$

The ionization distance $L_i$ corresponds to length HM of the normal N to the parabola in M minus the stream radius. This, for example, means a constant value of 1,2,3,4 mm. The equation of the normal N is derived from the equation of T.

$$N: y = -(1/2a)x + c$$

where $$y = ax_m^2$$

$$y = ax_m^2 = -(1/2a)x_m + c.$$

$$c = ax_m^2 + (1/2a)x_m.$$

but $$x_m = (y_m/a)^{1/2}.$$

$$c = a(y_m/a) + 1/2a(y_m/a)^{1/2}$$

$$c = y_m + (1/2a^{3/2})y_m.$$

$$N: y = -(1/2a)x + y_m + ky_m.$$

The ionization distance in the plasma chamber 28 in relation to the stream fed to the plasma chamber 28 is to be calculated using HM.

$$\begin{aligned}
HM^2 &= (y - y_m)^2 + (x - x_m)^2 \\
&= [(y_m/a)^{1/2} - 0]^2 + [y_m^2 - (-2\,a^{3/2}b^{1/2})]^2 \\
&= y_m/a + y_m^4 + (2\,a^{3/2})^2 y_m + 2 y_m^2 2 a^{3/2} y_m^{1/2} \\
&= y_m^4 + 4 a^{3/2} + y^{3/2} + (2a^3 + 1/a)\, y_m
\end{aligned}$$

of the formula $L^2 = y_m^4 + a y_m^{3/2} + b y_m$

This calculation confirms what is illustrated in FIGS. 5 and 6. This means that the interior side 30 of plasma chamber 28 in the area of the exit of stream 23 from the ceramic nozzle (adjacent to point A) extends virtually parallel to stream 23, then very quickly approaches stream 23 and, finally, as shown in point B, makes contact with stream 23.

Figure 7:
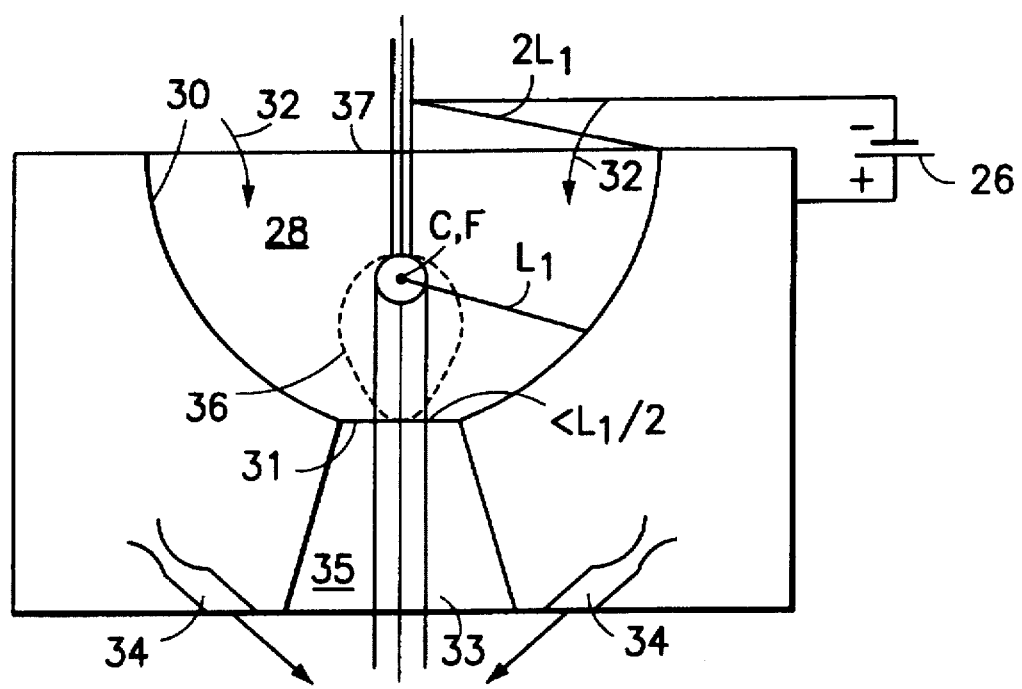
FIG. 7 is a schematic drawing showing an additional example of a plasma chamber with a device according to the invention.

FIG. 7 shows that the plasma settles at a point C, which, advantageously, should coincide with center F of the parabola. There the plasma behaves stably and is located in the ionization distance $L_i$ of the interior side 30 of plasma chamber 28. This operating point is particularly stable since the electrode distance above decreases gradually and below decreases rapidly.

According to FIG. 7 plasma chamber 28 has an upper diameter corresponding to 2 $L_i$. The plasma settles at C at a distance to the interior side 30 of plasma chamber 28 which equals $L_i$. On its underside, plasma chamber 28 has a passage 31 with a diameter smaller than length $L_i$. The injection of plasma gas - in the embodied example air is used—is indicated by directional arrows 32. Passage 31 expands conically towards the outside. In the area of its outlet opening 33, an additional gas is fed through ring nozzle 34 in such a manner that low pressure is produced in the area of the outlet opening 33. In this context, the ring nozzle 34 is developed as a supersonic nozzle like a Venturi nozzle. The plasma arc is designated in FIG. 7 by reference number 36.

Through this development of passage 31, the latter is elongated with a type of conical mixing tube whose internal bore is designated in FIG. 7 by reference number 35. Thus, passage 31 is connected with a Venturi nozzle and thus with an area of high flow velocity and low pressure. Mixing tube 35 in general has a small conical angle which may measure 7°–14°.

The stoichiometry of the powder to be produced can be determined at will by changing the gas quantity. In a preferred method,. a mixed crystal powder can be produced from indium and tin oxides, whereby the indium oxide portion amounts to 90 weight percent and the tin oxide portion to 10 weight percent. To produce a mixed crystal powder with substoichiometric oxygen content, a correspondingly low air current is fed to the plasma, said air current reacting with the metal melt in the plasma arc to produce the desired substoichiometric oxide.

The device according to our invention can also be fed with powder or with granulates.

An example for the commercial application of the invention is the continuous production of lead oxide PbO. The production of 1000 kg of oxide requires 928 kg of lead and 72 kg of oxygen, i.e. 101 m³. In addition, 96 kcal/mol (mol weight of PbO=224 g), i.e. ca. 430,000 kcal, must be fed. The liquid Pb flows from a crucible whose bottom is provided with a ceramic nozzle. It flows with an output of 1000 kg/h through the hole of the nozzle which has a diameter of 4 mm. The $O_2$ flow required for oxidation is introduced into the parabolic graphite chamber. The upper part of the plasma chamber can have, for example, a diameter of 60 mm, the lower part a diameter of 12 mm.

The voltage between the metal flow and the plasma chamber results in the precipitation of the plasma at a stable axis point. The plasma bubble is taken in by the Venturi nozzle resulting in the oxide powder being hurled downward. The powder produced in this manner is small-grained and has a fine grain size distribution.

What is claimed is:

1. A method for a continuous preparation of a powder comprising:

(a) generating a plasma arc by maintaining a voltage between a first electrode and a second electrode, and (b) feeding at least two reagents comprising a first reagent and a second reagent into the plasma arc for reaction of the reagents therein, wherein the first reagent is an electrically conductive metal in a fluid form of a solid or liquid and comprises the first electrode.

2. The method according to claim 1, wherein the first reagent which is the first electrode has a negative potential.

3. The method according to claim 1 or 2, wherein the plasma arc is provided with an energy which corresponds to a free formation enthalpy of the powder to be prepared and a heat loss in the plasma arc.

4. The method according to claim 3, wherein the first reagent is fed to the plasma arc in the form of a powder, and an electric connection to a voltage-maintaining generator is formed by ionization of a carrier gas.

5. The method according to claim 1, wherein the plasma arc is maintained in a plasma chamber with an essentially parabolic interior surface which is provided at one end thereof with a feed opening for receiving the first reagent and an outlet passage which is disposed at an end of the plasma chamber which is opposite the feed opening.

6. The method according to claim 5, wherein the first reagent is fed to the plasma chamber in a stream, wherein a longitudinal axis of the essentially parabolic interior of the plasma chamber runs coaxially to the stream, and the plasma chamber has a diameter in the vicinity of the feed opening which is larger than a mean ionization distance in the plasma arc, and the outlet passage has a diameter which is smaller than the mean ionization distance in the plasma arc.

7. The method according to claim 5 or 6, wherein the plasma arc is ignited in a center line of the essentially parabolic interior surface of the plasma chamber.

8. The method according to claim 5 wherein the outlet passage of the plasma chamber is connected to a mixing tube, the mixing tube terminating at an outlet opening of the plasma chamber in which low pressure is maintained.

9. The method according to claim 8, wherein the low pressure is maintained by a supersonic nozzle which is connected to the mixing tube.

10. The method according to claim 1, wherein the first reagent is a melt of tin and indium, and the second reagent is an oxygen-containing gas.

11. The method according to claim 1, wherein the first reagent is in the form of a melt, a liquid, a suspension, a dispersion, a gel or a powder.

12. The method according to claim 1, wherein the second reagent is a gas.

13. The method according to claim 12, wherein the first reagent is selected from the group consisting of Pb, Sn, Bi, Ga, Cu, In, Ag and Zn.

14. The method according to claim 13, wherein the second reagent is a gas selected from the group consisting of $O_2$, air, $Cl_2$, $N_2$ and methane.

15. The method according to claim 1, wherein the first reagent is a melt of indium and tin and the second reagent is an oxidizing gas.

16. A device for a continuous production of a powder by reacting at least a first reagent in a form of a solid or liquid metal, and a second reagent, in a plasma arc, the device comprising:

a plasma chamber, the plasma chamber having an essentially parabolic inner surface, the plasma chamber having a feed opening at one end thereof and an outlet passage which is disposed at an end of the plasma chamber which is opposite to the feed opening, a feed arrangement for feeding at least the first reagent to the opening in the plasma chamber, the feed arrangement comprising a vessel adapted for receiving at least the first reagent at a top end thereof, and having a vessel outlet which is disposed at a bottom end of the vessel which is opposite the top end thereof, and at least a first electrode, which is adapted to be formed by the first reagent, and a second electrode, the first electrode and the second electrode being connected to a generator for providing a plasma arc in the plasma chamber.

17. The device according to claim 16, wherein the feed opening is aligned along a longitudinal common axis with the outlet passage of the plasma chamber, and the plasma chamber has an upper diameter in the vicinity of the feed opening is larger than a mean ionization distance, and the outlet passage has a diameter which is smaller than the mean ionization distance.

18. The device according to claim 16 or 17, which further comprises a mixing tube, the mixing tube being connected to the outlet passage of the plasma chamber and having an interior cross-section which expands conically outwardly from the plasma chamber.

19. The device according to claim 18, which further comprises a supersonic nozzle which is connected to the mixing tube.

20. The device according to claim 18, which further comprises a ring nozzle which is disposed at an outlet of the mixing tube and which is adapted to eject a gas into material exiting the mixing tube to provide a venturi effect; and the mixing tube having a conical angle of 7° to 14°.

* * * * *